US010713976B2

(12) United States Patent
Weyermann (10) Patent No.: US 10,713,976 B2
(45) Date of Patent: Jul. 14, 2020

(54) MULTIPLE WRAP LABEL

(71) Applicant: CCL Label, Inc., Framingham, MA (US)

(72) Inventor: Ulrich E. Weyermann, Clarksboro, NJ (US)

(73) Assignee: CCL Label, Inc., Framingham, MA (US)

(*) Notice: Subject to any disclaimer, the term of this patent is extended or adjusted under 35 U.S.C. 154(b) by 0 days.

(21) Appl. No.: 14/826,648

(22) Filed: Aug. 14, 2015

(65) Prior Publication Data
US 2016/0049101 A1 Feb. 18, 2016

Related U.S. Application Data (60) Provisional application No. 62/038,061, filed on Aug. 15, 2014, provisional application No. 62/079,201, (Continued)

(51) Int. Cl.
*G09F 3/00* (2006.01)
*G09F 3/10* (2006.01)
(Continued)

(52) U.S. Cl.
CPC ............ *G09F 3/0295* (2013.01); *B29C 65/10* (2013.01); *B29C 65/66* (2013.01); *B29C 66/1122* (2013.01); *B29C 66/5326* (2013.01); *B29C 66/65* (2013.01); *B65C 3/12* (2013.01); *B65C 3/166* (2013.01); *G09F 3/0288* (2013.01); *G09F 3/0291* (2013.01); *G09F 3/06* (2013.01); *G09F 3/10* (2013.01); *B29C 65/4825* (2013.01); *B29C 66/4322* (2013.01); *B29C 66/71* (2013.01); *B29C 66/7392* (2013.01); *B29L 2031/712* (2013.01); (Continued)

(58) Field of Classification Search
CPC ......... B29C 65/10; B29C 65/02; B29C 65/66; B29C 65/4825; B29C 66/4322; B29C 66/1121; B29C 66/5326; B65C 3/12; B65C 3/166; G09F 3/0295; G09F 3/0288; G09F 3/0291; G09F 3/06; G09F 3/10; G09F 2003/0241; G09F 2003/0272; B29L 2031/712; B29L 2031/744
See application file for complete search history.

(56) References Cited

U.S. PATENT DOCUMENTS 5,342,093 A * 8/1994 Weernink ............... G09F 3/10 283/81
5,403,416 A 4/1995 Bright et al.
(Continued)

OTHER PUBLICATIONS

International Search Report of the International Searching Authority dated Nov. 9, 2015, issued in connection with International Application No. PCT/US15/45277 (3 pages).
(Continued)

*Primary Examiner* — Laura C Powers
(74) *Attorney, Agent, or Firm* — McCarter & English, LLP (57) ABSTRACT

A multiple wrap label has a first wrap portion extending from a first end and having a first width, and a second wrap portion extending from the first wrap portion to a second end, the second wrap portion having a second width greater than the first width, the second wrap portion extending over and enclosing the first wrap portion when the label is applied to a container.

4 Claims, 7 Drawing Sheets

Related U.S. Application Data filed on Nov. 13, 2014, provisional application No. 62/079,349, filed on Nov. 13, 2014.

(51) Int. Cl.
| | |
|---|---|
| *G09F 3/06* | (2006.01) |
| *B29C 65/00* | (2006.01) |
| *B29C 65/66* | (2006.01) |
| *B65C 3/12* | (2006.01) |
| *B29C 65/10* | (2006.01) |
| *B65C 3/16* | (2006.01) |
| *B29L 31/00* | (2006.01) |
| *G09F 3/02* | (2006.01) |
| *B29C 65/48* | (2006.01) |

(52) U.S. Cl.
CPC . *B29L 2031/744* (2013.01); *G09F 2003/0241* (2013.01); *G09F 2003/0272* (2013.01)

(56) References Cited

U.S. PATENT DOCUMENTS

| | | | |
|---|---|---|---|
| 8,263,201 B2* | 9/2012 | Caveney | G09F 3/0295 428/343 |
| 2003/0020274 A1 | 1/2003 | Milliorn | |
| 2003/0134073 A1* | 7/2003 | Sellars | G09F 3/0289 428/40.1 |
| 2004/0247837 A1* | 12/2004 | Enlow | B32B 27/00 428/195.1 |
| 2006/0029761 A1 | 2/2006 | Matthews et al. | |
| 2007/0148393 A1 | 6/2007 | Sellars | |
| 2007/0285792 A1 | 12/2007 | Raymond et al. | |
| 2009/0277570 A1 | 11/2009 | Caveney et al. | |
| 2013/0121624 A1* | 5/2013 | Lyzenga | B65B 9/067 383/203 |
| 2015/0013273 A1* | 1/2015 | McKillip | G09F 3/0289 53/442 |

OTHER PUBLICATIONS

Written Opinion of the International Searching Authority dated Nov. 9, 2015, issued in connection with International Application No. PCT/US15/45277 (7 pages).

Extended European Search Report dated Feb. 27, 2018, issued by the European Patent Office in connection with European Patent Application No. 15832653.8 (7 pages).

\* cited by examiner (Prior Art)
FIG. 1

MULTIPLE WRAP LABEL

CROSS-REFERENCE TO RELATED APPLICATIONS

The present application claims the priority of U.S. Provisional Application Ser. No. 62/038,061, filed Aug. 15, 2014, U.S. Provisional Application Ser. No. 62/079,201, filed Nov. 13, 2014, and U.S. Provisional Application Ser. No. 62/079,349 filed Nov. 13, 2014, the disclosures of which are expressly incorporated herein by reference in their entirety.

BACKGROUND

1. Field of the Disclosure

The present disclosure relates to a multiple wrap pressure sensitive label.

2. Related Art

Figure 1:
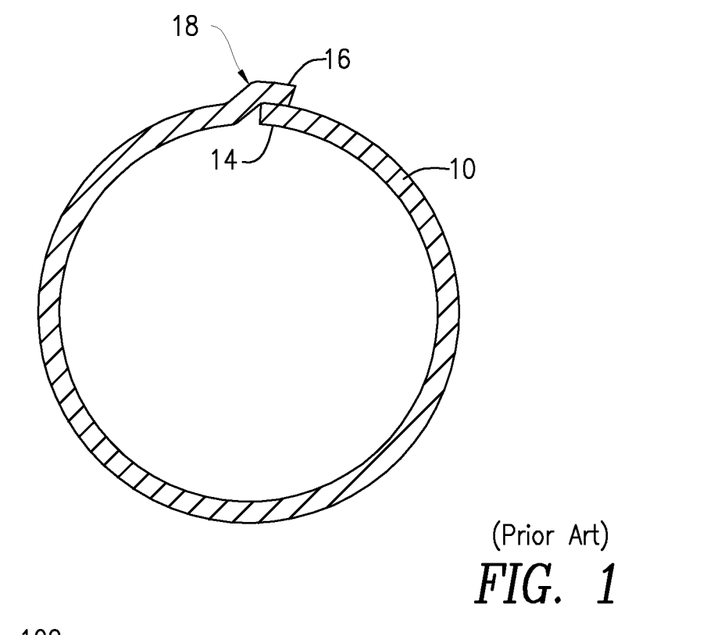
FIG. 1 shows a label according to the prior art.

Efficient and cost effective communication of information to a consumer is important for any business. Labels are commonly used on tubes, containers, and other items to advertise and communicate safety, proper use, and other information to consumers. Pressure sensitive (PS) labels have been used in the past to label and decorate consumer products. FIG. 1 shows a prior art PS label 10 configured to wrap around a container. As shown, the label 10 has a first end 14 and a second end 16. The distance from the first end 14 to the second end 16 is slightly greater than the circumference of the container, so the second end 16 of the label 10 extends beyond the first end 14 to form an angle greater than 360 degrees (e.g., 370 degrees). A ridge 18 is formed where the second end 16 overlaps the first end 14, which can be unappealing from an aesthetic and/or durability standpoint. More particularly, these prior art labels 10 pose great challenges in providing 360 degrees of decorative content around the container. Also, in the case of these prior art labels 10, the ridge 18 extends along the edges of the label, thereby making the edges more prone to damage and/or inadvertent peeling (e.g., dog-earing).

What would be desirable, but has not yet been developed, is a PS label that accommodates a 360 degree decorative design, while minimizing damage to the edges.

SUMMARY

The present disclosure relates to a multiple wrap PS label with a first wrap portion and a second wrap portion. When applied to a container, the first wrap portion is disposed beneath the second wrap portion. The second wrap portion has a width that is slightly greater than the first wrap portion, such that the second wrap portion extends past the edges of the first wrap portion and encloses the first wrap portion. Such a label could be cut to any desired geometry and applied to virtually any type of product or container.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a multiple wrap PS label, as discussed below in connection with FIGS. 2-7. More specifically, the present disclosure relates to a multiple wrap PS label with a first wrap portion and a second wrap portion. The second wrap portion has a width that is greater than that of the first wrap portion, so that the second wrap portion extends past the edges of the first wrap portion, when the label is wrapped around a container, and encloses the first wrap portion. The label could be formed (e.g., die cut) to a desired geometry based on the dimensions of a specified tube or container. The label can be applied to any consumer product tube or container. The label could have any shape and could be made from any heat shrinkable construction of a standard (e.g., non-shrinkable) and/or machine direction heat shrinkable film(s) (e.g., polyethylene (PE), biaxially oriented polypropylene (BOPP), polyethylene terephthalate (PET), polyethylene terephthalate glycol (PETG), etc.). The label could be bonded to a container (e.g., tube) by means of a pressure sensitive adhesive on the label. Further, the label could be of a single film or a lamination of two films, such as by a laminating process with two or more machine direction oriented shrinkable Polyolefin, PVC (polyvinyl chloride), and/or Polystyrene films. Any or all of the films could be standard films or machine direction heat shrinkable films.

Figure 2:
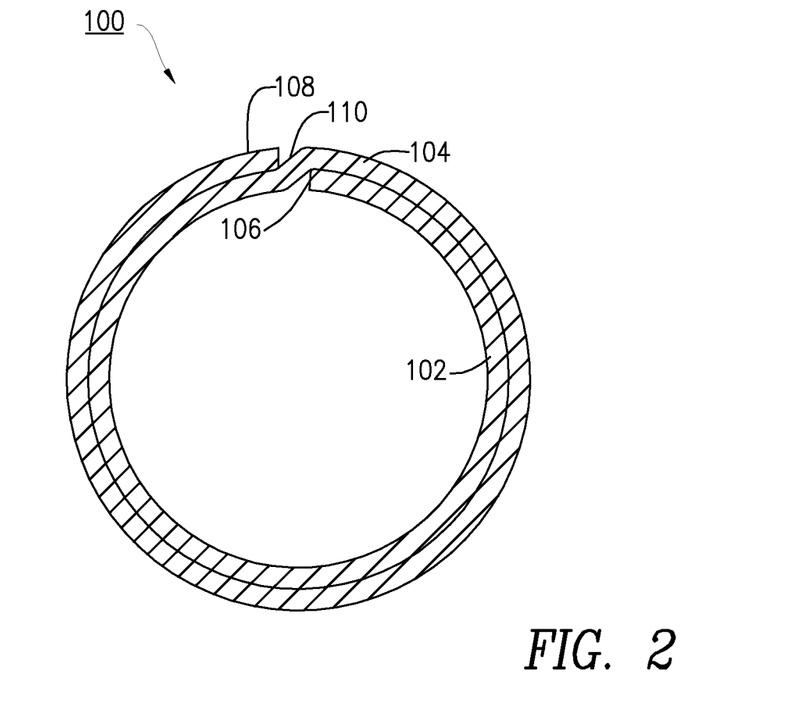
FIG. 2 shows a top view of a multiple wrap label.

FIGS. 2-5 show a multiple wrap PS label 100 for use with a tube or container. More specifically, FIG. 2 shows a top view of a label 100 in a wrapped configuration. The label 100 has a first wrap portion 102 and a second wrap portion 104, and the second wrap portion 104 is disposed over the first wrap portion 102 in the wrapped configuration. A ridge 110 is formed where the first wrap portion 102 transitions into the second wrap portion 104. The second wrap portion 104 terminates near the ridge 110 so a second end 108 is adjacent to the ridge 110, and the label 100 forms an angle of just less than 720 degrees (e.g., approximately 718 degrees).

Figure 3:
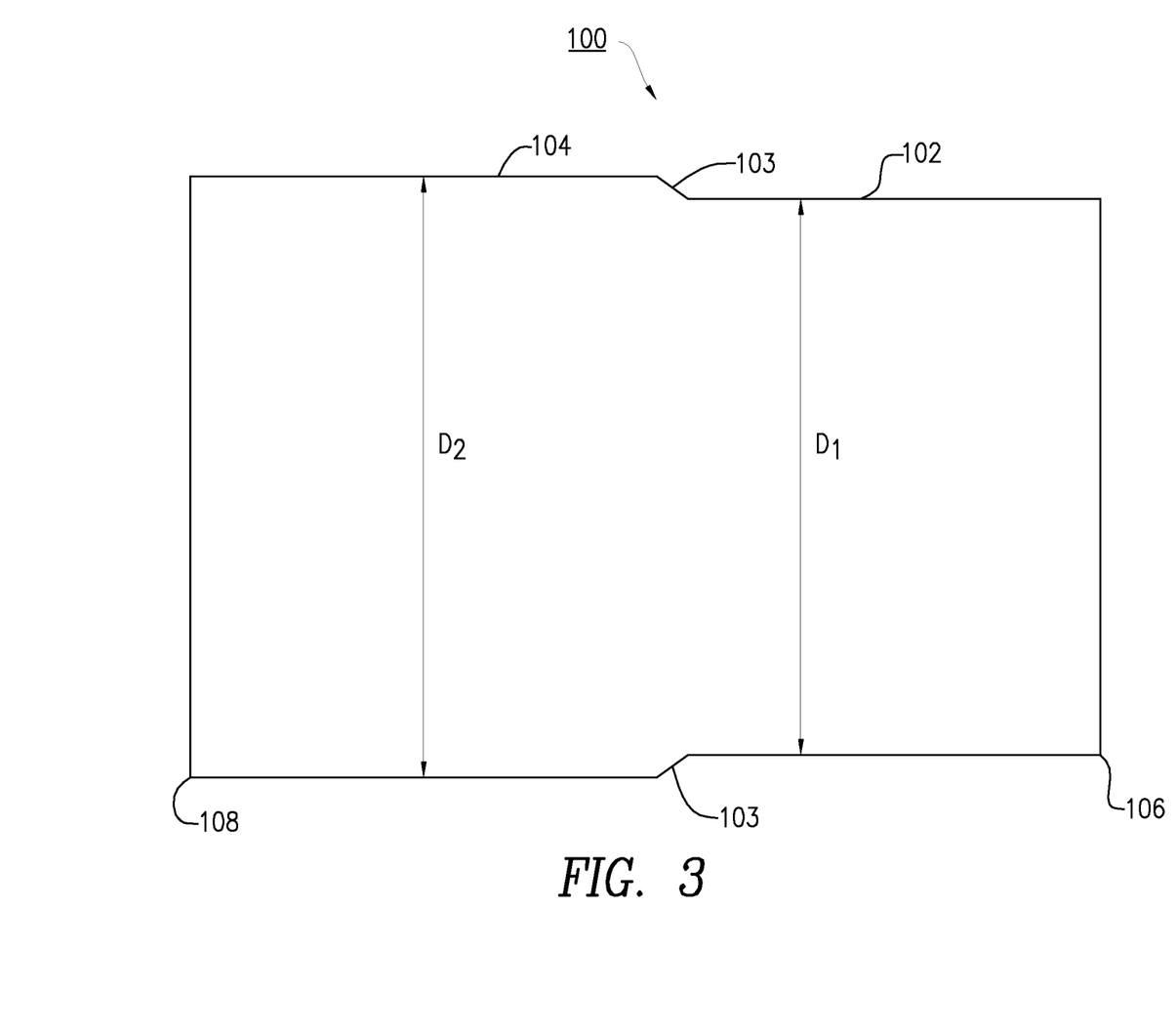
FIG. 3 shows the multiple wrap label of FIG. 2 that is laid flat.

As shown in FIG. 3, the label 100 has a length extending from a first end 106 to the second end 108. The first wrap portion 102 extends lengthwise from the first end 106 to the second wrap portion 104, and the second wrap portion 104 extends from the first wrap portion to the second end 108. The first wrap portion 102 has a first width D1 and the second wrap portion has a second width D2, wherein the first width D1 is less than the second width D2. Angled edge 103 forms a junction between the first wrap portion 102 and the second wrap portion 104

Figure 4:
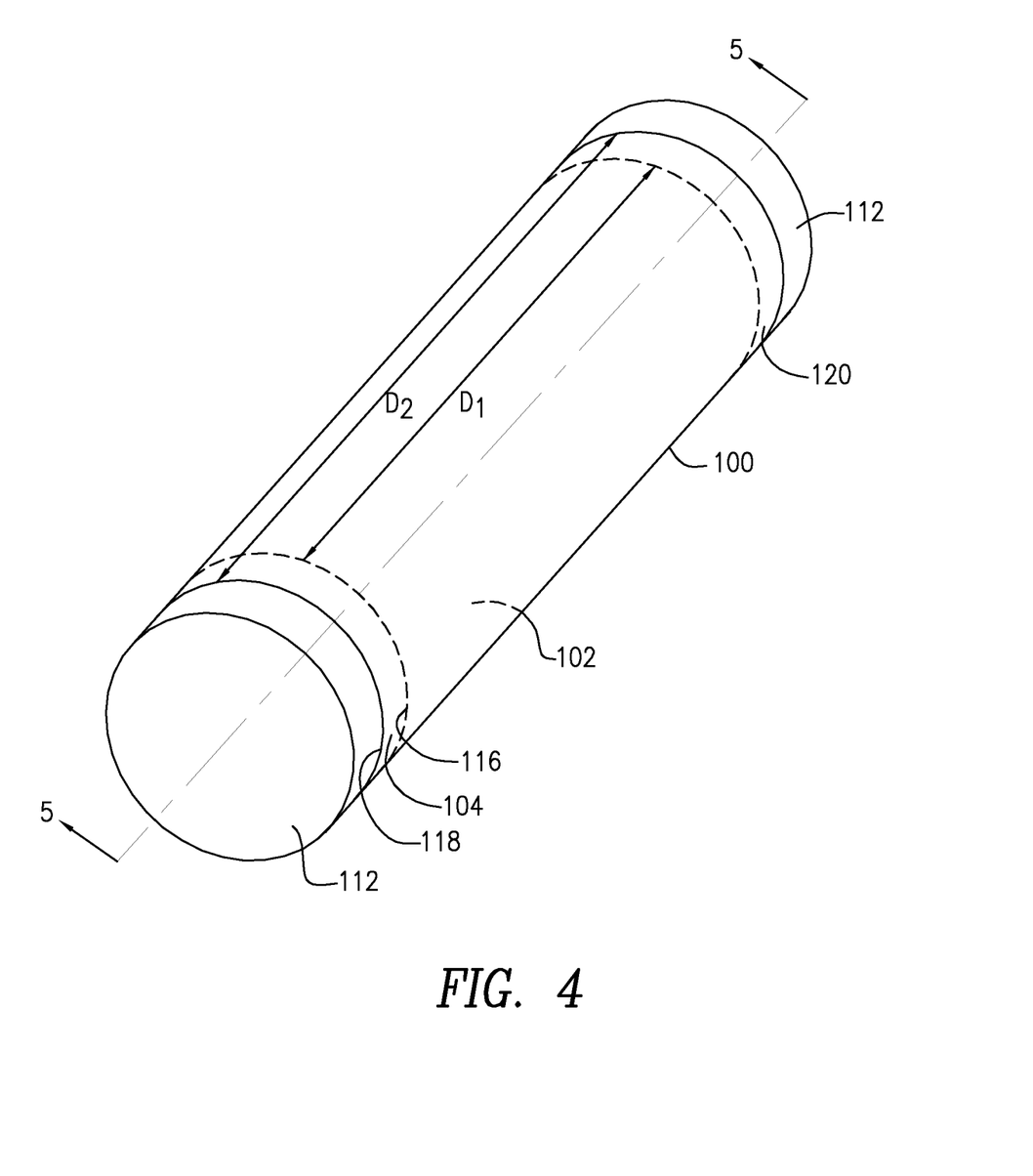
FIG. 4 shows the multiple wrap label of FIG. 2 applied to a tube.

FIG. 4 shows the multiple wrap PS label 100 applied to a tube 112. The first wrap portion 102 has a first die line 116 (at D1), and the second wrap portion 104 wraps over the first wrap portion 102 and has a second die line 118 (at D2).

Figure 5:
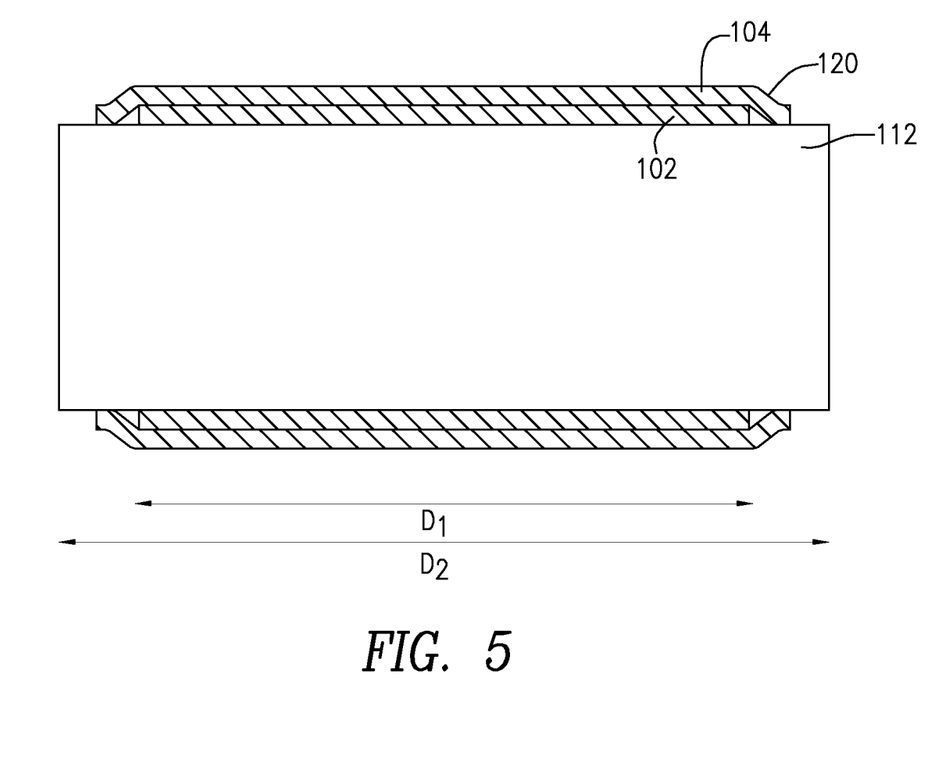
FIG. 5 is a sectional view of the multiple wrap label of FIG. 2 applied to a tube, along line 5-5 as shown in FIG. 4.

FIG. 5 is a sectional view, taken along line 5-5 in FIG. 4, of the multiple wrap PS label 100 applied to tube 112. As shown, the second wrap portion 104 extends past the edges of the first wrap portion 102 and encloses the edges of the first wrap portion 102. Because D2 is greater than D1, a portion of the second wrap portion 104 forms a lip 120 that extends beyond the first wrap portion 102 and contacts the tube 112 directly. For example, the lip 120 can be shrunk to the tube 112. The label 100 can be made with at least one layer of a heat shrinkable film that allows for the lip 120 of the second wrap portion 104 to be shrunk to the container, thereby enclosing the first wrap portion 102. The reduced caliper of the material with the tucked-in edge of the first wrap portion 102 allows for a decoration with reduced ridge. The label of this invention can be created with films of thinner construction, providing a lower profile of the ends (overlap and sides) compared to a standard 370 degree decoration (e.g., compared to the prior art label 10 shown in FIG. 1).

Figure 6:
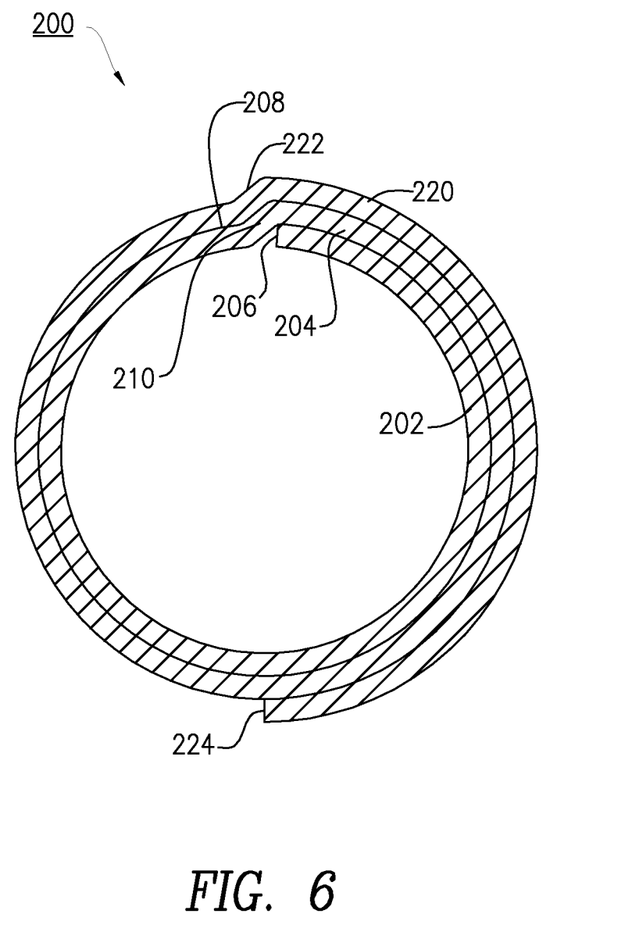
FIG. 6 shows another multiple wrap label.
Figure 7:
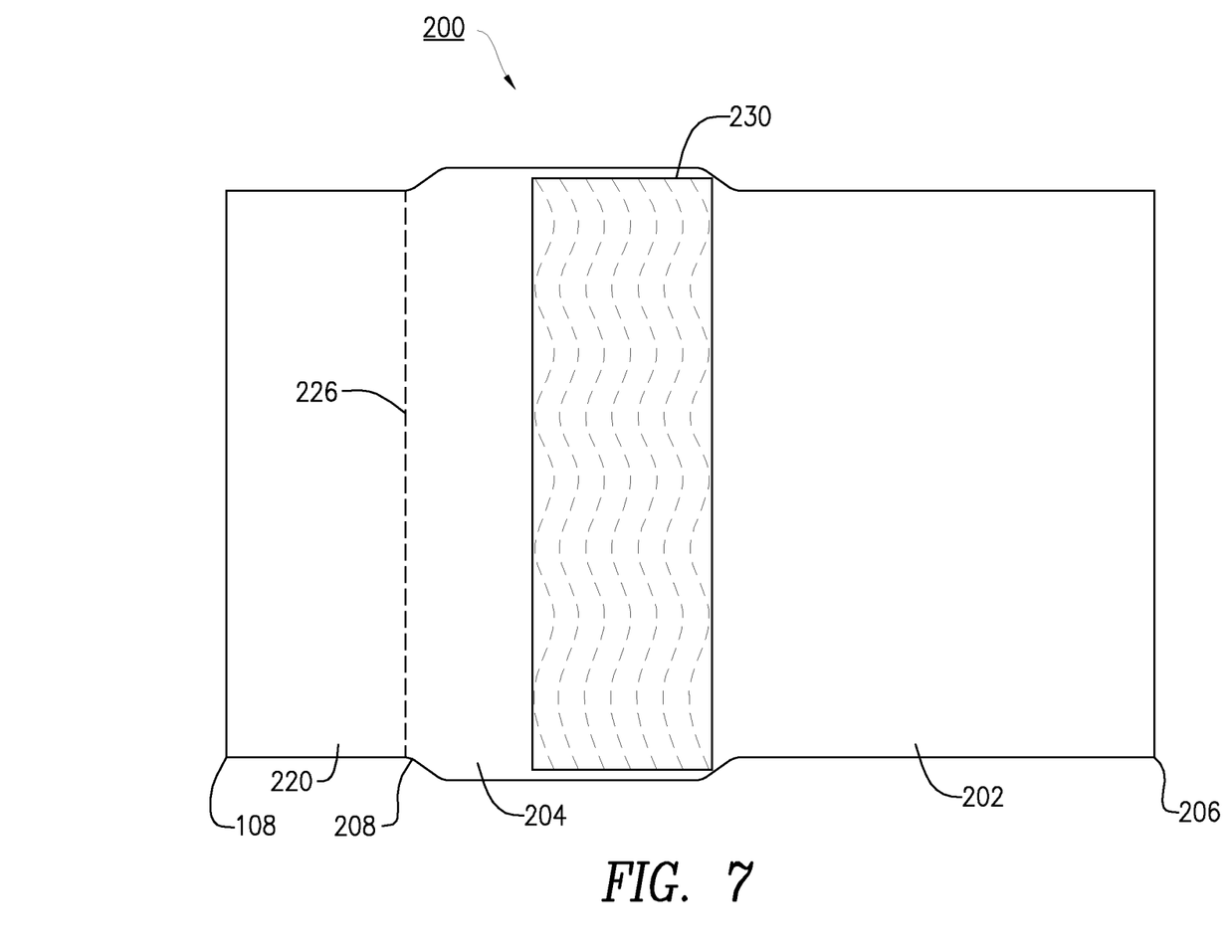
FIG. 7 shows the multiple wrap label of FIG. 6 that is laid flat.

FIGS. 6-7 show another multiple wrap PS label 200 for use with a tube or container, the label 200 having an extended content portion 220. The extended content portion 220 can accommodate any type of content such as additional information, a redeemable coupon (RC), and/or an in-store redeemable coupon (IRC). The extended content portion 220 can be removable from the rest of the label 200. The surface of the second wrap that is exposed to the adhesive of the extended portion is printed with a release coating in order to allow the removable portion to be peeled back from the second wrap of the label. For example, in cases where the extended content portion 220 is a coupon, a user can remove the extended content portion 220 such that the label extends to end 208, while the rest of the label 200 remains intact on the tube or container. FIG. 6 shows a top view of the label 200 configured to be wrapped around a tube or container, the label 200 having a first wrap portion 202, a second wrap portion 204, and an extended content portion 220. In the wrapped configuration, the extended content portion 220 is disposed over at least some of the second wrap portion 204, and the second wrap portion 204 is disposed over at least some of the first wrap portion 102. A first ridge 210 is formed where the first wrap portion 202 transitions into the second wrap portion 204. A second ridge 222 is formed over the first ridge 210 where the second wrap portion 204 transitions into the extended content portion 220.

As shown in FIG. 7, the label 200 has a length extending from a first end 206 to an extended end 224. The first wrap portion 202 extends lengthwise from the first end 206 to the second wrap portion 204, and the second wrap portion 204 extends from the first wrap portion 202 to the extended content portion 220. The extended content portion 220 extends from the second wrap portion 204 to the extended end 224. A seam 226 can be formed between the second wrap portion 204 and the extended content portion 220. For example, the seam 226 can be perforated, nicked or pre-cut. As such, a user can remove the extended content portion 220, while leaving the first wrap portion 202 and second wrap portion 204 intact (e.g., not damaged or deformed) on the tube or container.

The extended content portion 220 can be removably secured to the top of the second wrap portion 204 by way of an adhesive (e.g., a pressure sensitive adhesive). An alternative method the top of the second wrap portion 204 can have a release coating 230 applied to allow a standard pressure sensitive adhesive to be removed. Another method is to print a varnish over the release coating 230 of the portion of the second wrap portion 204. The adhesive of the extended content portion 220 bonds with the varnish of the second wrap portion 204 and lifts the varnish off the release coating 230 at the time the extended content portion 220 is removed. In this method the extended content portion 220 has not exposed adhesive on the underside and can be stored or accumulated without sticking to other items (e.g., to other extended content portions). During removal of the extended content portion 220, a user can peel the extended content portion 220 from the second wrap portion 204, and tear the extended content portion 220 along the seam 226. The extended content portion 220 could include indicia to direct a user as to proper use of the expanded content panel More specifically, the expanded content portion 220 could include indicia to indicate that the portion 220 is peelable and/or the easiest place from which to peel the portion 220 open.

Upon removal of the extended content portion 220, the label 200 extends from the first end 206 to a second end 208, and can be configured similarly to the label 100 described above and shown in FIGS. 2-5. As such, after the extended content portion 220 is removed, the label 200 can display a 360 degree decorative design. The label 200 construction comprises a multiple wrap decoration for a back panel extended content label, redeemable coupon, and/or in-store redeemable coupon. The label 200 could form an angle of any degree. For example, when wrapped around a tube or container, the label 200 could form an angle of 900 degrees, or a degree between the range of greater than or equal to 700 degrees and less than or equal to 1079 degrees.

Figure 8A:
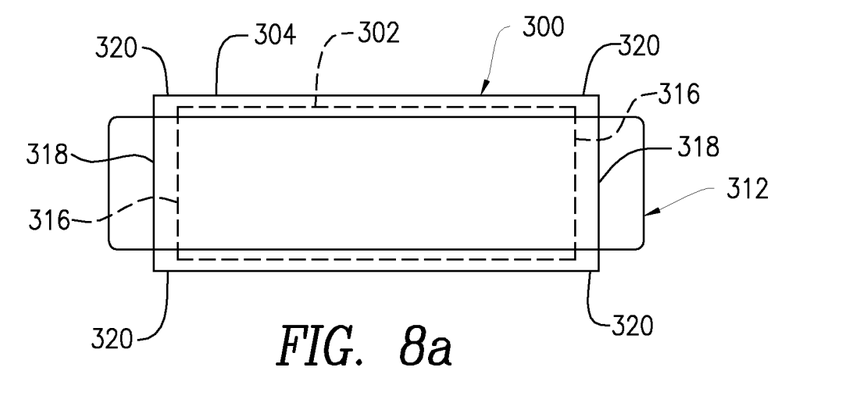
FIG. 8a-8c show a process for forming the multiple wrap label of the present disclosure.
Figure 8B:
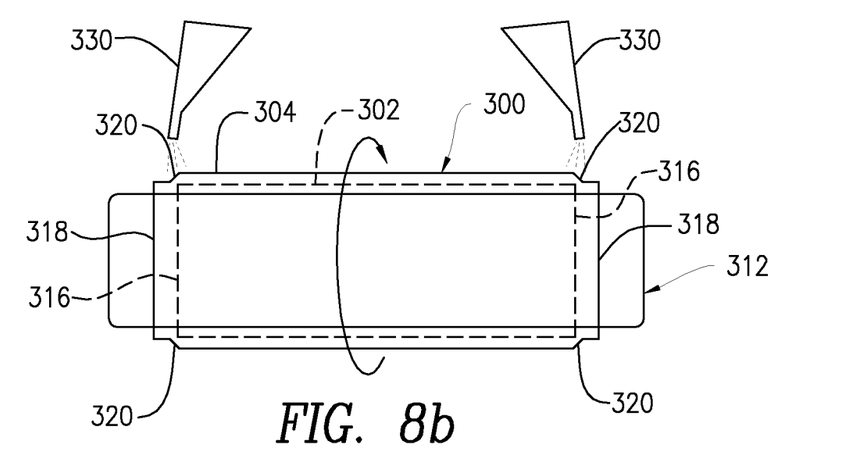
Figure 8C:
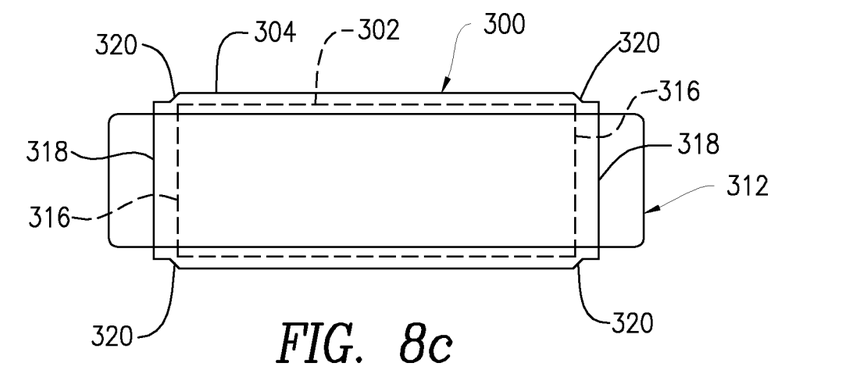

FIG. 8a-8c shows a process for forming the multiple wrap label 300 of the present disclosure (as described above). The label 300 could have any shape (e.g., such as those shown in the figures herein), could be made from any heat shrinkable construction of a standard and/or machine direction heat shrinkable film (e.g., PE, BOPP, PET, PETG, etc.). Further, the label 300 could be bonded to a tube or container by means of a laminating process with a machine direction oriented shrinkable Polyolefin, PVC (polyvinyl chloride), and/or Polystyrene film (as described above). Although a tube is shown and described with respect to FIGS. 8a-8c, the label 300 could instead be applied to a container or to any other product.

In FIG. 8a, the multi-wrap label, generally indicated at 300, is shown positioned around a tube 312. The label 300 has been applied to the tube 312 via the pressure-sensitive adhesive of the label 300. More specifically, a first wrap portion 302 (e.g., inner wrap portion), having a first die line 316, is positioned around (e.g., applied to) the tube 312, and a second wrap portion 304 (outer wrap portion), having a second die line 318, is positioned around (e.g., applied to) the first wrap portion 302 and the tube 312. Part of the second wrap portion 304 forms a lip 320 (e.g., overlap area) that extends beyond the first wrap portion 302 (as the length of the second wrap portion 304 along the tube is greater than the length of the first wrap portion 302 along the tube). In this way, the label 300 is applied to the tube 312.

In FIG. 8b, heat is being applied to the lip 320 at both ends of the label 300. The heat (e.g., hot air) could be directed to the lip 320 specifically by one or more heat application devices 330 (e.g., nozzles), where the nozzles 330 could be positioned in close proximity to the label 300. Further, as the lip 320 is wrapped around the tube 312, the tube 312 and the label 300 could be rotated so that heat is applied to all (e.g., 360 degrees) of the lip 320 (e.g., at each end of the label 300).

In FIG. 8c, the label 300 with the lip 320 is heat shrunk onto the tube 312. The application of heat causes the lip 320 to shrink and form a tight seal to the body of the tube 312 at both ends of the label 300. Further, applying heat to the label 300 by directing the airflow of hot air (e.g., positioned proximate the label 300) allows the lip 320 to uniformly shrink to the tube. This protects the underside of the second wrap portion 304, and prevents any deformation of the lip 320. This also protects the edges of the first wrap portion 302, as well as seals or encloses the first wrap portion 302 (e.g., from contamination). Heat shrinking of the lip 320 also prevents the formation of any darting that could be caused by the second wrap portion 304 wrapping two different sized cylinders (e.g., the undecorated tube 300 of one size, and tube 300 and first wrap portion 302 of a second size).

As indicated, the label is of use in labeling, covering, and/or decorating a variety of consumer product containers. The label may be used in a variety of labeling processes including cut and stack, and pressure-sensitive labeling. A consumer product wrapped in a label of the present disclosure is also provided. Consumer products include containers or tubes (e.g., flexible plastic tubes).

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A heat shrinkable multiple wrap label, comprising:
   a first wrap portion extending from a first end and having a first width; and
   a second wrap portion extending from the first wrap portion to a second end, the second wrap portion having a second width greater than the first width, the second wrap portion extending over and overlying the first wrap portion such that an interior surface of the second wrap portion contacts an exterior surface of the first wrap portion when the label is applied to a container, and where the second wrap portion extends past edges of the first wrap portion when the label is wrapped around the container, and encloses the first wrap portion, wherein
   an underside of the heat shrinkable label comprises a pressure sensitive adhesive and an underside of the second wrap portion adheres to and is not removable from the first wrap portion over a length of the first wrap portion and encloses and seals the first wrap portion when the label is applied to the container.

2. The heat shrinkable multiple wrap label of claim 1, wherein a lip is formed from the width of the second wrap portion extending beyond the width of the first wrap portion and directly contacting the container.

3. The heat shrinkable multiple wrap label of claim 1, wherein the second wrap portion includes a lip, the lip being formed where the width of the second wrap portion extends past the width of the first wrap portion such that the multiple wrap label shrinks and forms a tight seal between the multiple wrap label and the container, the first wrap portion disposed beneath, and enclosed by, the second wrap portion when heat is applied to the lip by at least one heat application device while the multiple wrap label and the container are rotated.

4. The heat shrinkable multiple wrap label of claim 3, wherein from a top view of the label in a wrapped configuration, a ridge is formed where the first wrap portion transitions to the second wrap portion, and the second wrap portion terminates near the ridge so the second end is adjacent to the ridge and the label forms an angle of approximately 718 degrees.

* * * * *